United States Patent
Raithel

(10) Patent No.: US 9,753,513 B2
(45) Date of Patent: Sep. 5, 2017

(54) ACTUATING DRIVE AND METHOD FOR SERVICING AND/OR COMMISSIONING AN ACTUATING DRIVE

(71) Applicant: SIPOS Aktorik GmbH, Altdorf (DE)

(72) Inventor: Ulrich Raithel, Uttenreuth (DE)

(73) Assignee: SIPOS AKTORIK GMBH, Altdorf (DE)

( * ) Notice: Subject to any disclaimer, the term of this patent is extended or adjusted under 35 U.S.C. 154(b) by 54 days.

(21) Appl. No.: 14/926,487

(22) Filed: Oct. 29, 2015

(65) Prior Publication Data
US 2016/0124480 A1    May 5, 2016

(30) Foreign Application Priority Data
Oct. 29, 2014    (DE) .................. 10 2014 016 056

(51) Int. Cl.
| | | |
|---|---|---|
| G05B 23/02 | (2006.01) | |
| G06F 1/26 | (2006.01) | |
| G05B 19/414 | (2006.01) | |
| F16K 31/02 | (2006.01) | |
| G06F 13/42 | (2006.01) | |
| G05D 1/00 | (2006.01) | |
| G05B 9/02 | (2006.01) | |

(52) U.S. Cl.
CPC .............. *G06F 1/266* (2013.01); *F16K 31/02* (2013.01); *G05B 19/414* (2013.01); *G06F 13/4265* (2013.01); *G05B 9/02* (2013.01); *G05B 2219/25004* (2013.01); *G05B 2219/25166* (2013.01); *G05B 2219/34309* (2013.01); *G05B 2219/50083* (2013.01); *G05D 1/0077* (2013.01); *Y02B 60/1228* (2013.01); *Y02B 60/1235* (2013.01)

(58) Field of Classification Search
CPC .... G05D 1/0077; G05B 9/02; G05B 19/4062; G05B 2219/41363; G05B 19/232
USPC ......................................... 318/565; 713/310
See application file for complete search history.

(56) References Cited

U.S. PATENT DOCUMENTS

| | | | | |
|---|---|---|---|---|
| 2003/0078697 | A1* | 4/2003 | Kockemann | F15B 21/08 700/282 |
| 2004/0220685 | A1* | 11/2004 | Heinemann | G05B 19/406 700/79 |
| 2013/0271056 | A1* | 10/2013 | Bunte | F03D 7/0224 318/503 |
| 2013/0282249 | A1* | 10/2013 | Heise | B60T 7/042 701/70 |

FOREIGN PATENT DOCUMENTS

DE    10320698    12/2004

\* cited by examiner

*Primary Examiner* — Kawing Chan
*Assistant Examiner* — Bradley Brown
(74) *Attorney, Agent, or Firm* — Volpe and Koenig, P.C.

(57) ABSTRACT

In an actuating drive (1), an electronic controller (2) and a data bus interface (5) are configured in such a way that, as an alternative to supply via a power supply connection (4), the electronic controller (2) can be supplied via a data bus interface (5) if the power supply connection (4) is voltage-free.

9 Claims, 1 Drawing Sheet

ACTUATING DRIVE AND METHOD FOR SERVICING AND/OR COMMISSIONING AN ACTUATING DRIVE

INCORPORATION BY REFERENCE

The following documents are incorporated herein by reference as if fully set forth: German Patent Application No. DE 102014016056.4, filed Oct. 29, 2014.

BACKGROUND

The invention relates to an actuating drive, in particular an electronic actuating drive, wherein an electronic controller in which parameters and/or state variables of the actuating drive can be processed and/or varied is constructed, wherein the electronic controller can be supplied during operation via a power supply connection of the actuating drive, wherein a data bus interface is constructed and is connected to the electronic controller.

Actuating drives are known and are used, for example, for activating valves in process plants in an automated and/or remote-controlled fashion. For this purpose, the actuating drives each have an electronic controller with which an activator, for example an electric motor, can be actuated. The electronic controller accesses parameters with which it can be adapted to the respectively connected valve.

The invention also relates to a method for servicing and/or commissioning an actuating drive, wherein an electronic controller of the actuating drive is supplied in a normal operating mode via a power supply connection of the actuating drive, wherein parameters and/or state variables of the actuating drive are processed and/or varied in the electronic controller, and wherein at least one servicing step is triggered via a data bus interface. It is known that in order to commission, actuating drives they have to be adapted to the respectively connected valve with a servicing step. During operation, it may also be necessary to adapt the actuating drive by means of servicing steps.

Actuating drives are frequently supplied from a high current power supply. In order to avoid danger to operators, this high current power supply, frequently a 400V power supply, is switched off if the operator is active in the process plant.

SUMMARY

The invention is based on the object of simplifying the commissioning and/or servicing of an actuating drive in a process plant.

In order to achieve this object, one or more features according to the invention are provided. In particular, in the case of an actuating drive of the type described at the beginning it is therefore proposed according to the invention in order to achieve the object that the electric controller be additionally capable of being supplied with electrical energy via the data bus interface. It is advantageous here that it is possible to perform commissioning in situ in the process plant when the main supply is switched off by virtue of the fact that the necessary electrical energy for commissioning can be made available via the data bus interface. The invention therefore makes use of the fact that the necessary power consumption during commissioning is significantly lower than the power consumption in the normal operating mode, that is to say, for example, when a connected value is activated. The invention can advantageously also be used in the event of a change in the parameters and/or reading out of state variable and/or changing of software in the electronic controller or some other servicing step being necessary or desirable at a later time after the commissioning. Parameters can be, for example, end positions of the valve, adjustment travel, adjustment speeds, torques at the end positions or other variables with which a switched state and/or a switching behavior of the connected valve can be described. State variables may be, for example, physical measurement variables which describe an instantaneous state of the valve and/or of the actuating drive.

The electronic controller can therefore be optionally supplied via the power supply connection or via the data bus interface.

In one embodiment of the invention it is possible to provide that the parameters and/or state variables of the actuating drive can be transmitted via the data bus interface. The invention therefore makes use of a connection which is necessary in any case for commissioning or servicing. Further connecting cables can be dispensed with.

In one embodiment of the invention it is possible to provide that the electronic controller is configured to actuate an activator of the actuating drive. The activation of the valve can therefore be configured with the invention.

In one embodiment of the invention it is possible to provide that the data bus interface is embodied as a USB interface or as an Ethernet interface. It is advantageous here that the USB interface makes available a pin, and the Ethernet interface makes available conductors, which pin or conductors can be used to supply the electronic controller.

In one embodiment of the invention it is possible to provide that the electronic controller is arranged in a removable fashion on the actuating drive. It is advantageous here that the electronic controller can be attached at a location at which means for commissioning, for example a computer and/or a further actuating drive, are present. Long connecting lines can therefore be dispensed with. An additional supply connection for the electronic controller can also be dispensed with. The electronic controller can therefore be brought, for example, to an actuating drive which is already configured and/or activated, in order to assume the settings thereof. It is particularly favorable if the electronic controller is arranged in a control head. The electronic controller can therefore be embodied in such a way that it is protected against mechanical stress and can be removed from the actuating drive.

In one embodiment of the invention it is possible to provide that a switching device is configured to perform switching from supplying the electronic controller via the power supply connection to supplying the electronic controller via the data bus interface. The electronic controller can therefore optionally be supplied via the power supply connection or via the data bus interface. The switching device is preferably designed for automatic switching. It is possible to provide, for example, that the switching device is embodied and configured to detect automatically a failure or switching off of the power supply connection. It is therefore possible to ensure that the electronic controller can be made available for servicing steps independently of the stability of a power supply. For example, the switching device can have a diode switch which is known per se and through which the respectively higher voltage of the voltage present at the power supply connection and the voltage present at the data bus interface passes.

In order to achieve the specified object, the invention provides, in a method for servicing an actuating drive, the features of the independent claim which is directed to a method. In particular, in a method of the type described at the outset, the invention provides, for the purpose of achieving the object, that the electronic controller be supplied with electrical energy via the data bus interface at least during execution of the at least one servicing step. The invention therefore permits the servicing step to be executed even when the main supply is switched off. When a main supply is present, the electronic control can, as hitherto, be carried out via the power supply connection. The invention has recognized that in order to execute the servicing step, a further electrical device is always necessary. The invention uses an energy supply of this further device in order to make available, for the electronic control, the electrical energy which is necessary for the servicing step. A separate supply connection for the electronic control can therefore be dispensed with.

The servicing step can comprise, for example, reading out and/or describing a parameter value or a state variable via the data bus interface. Additionally or alternatively, the servicing step can comprise installing software via the data bus interface, for example in order to change or expand a functionality of the actuating drive. Additionally or alternatively, the servicing step can comprise carrying out an activation process of an activator of the actuating drive via the data bus interface. This is advantageous particularly when the activator is not driven electrically but rather, for example, mechanically and/or hydraulically and/or pneumatically.

In one embodiment of the invention it is possible to provide that the electronic controller is disconnected from the power supply connection during the servicing step. It is therefore reliably possible to prevent a situation in which during the commissioning and/or other servicing an operator comes into contact with voltage potentials which occur or are present in the normal operating mode.

In one embodiment of the invention it is possible to provide that the electronic controller is supplied from a communication participant which is connected to the data bus interface. An energy supply of the communication participant, which is necessary in any case for exchanging data via the data bus interface, can be used to supply the electronic controller, at least during the exchange of data or as long as the communication participant is connected to the data bus interface.

In one embodiment of the invention it is possible to provide that the communication participant is fed from an energy store, in particular an accumulator. It is advantageous here that the power supply connections can be dispensed with entirely during the servicing step.

In one embodiment of the invention it is possible to provide that the electronic controller is supplied via a data bus interface of a further actuating drive. The copying of settings from a further actuating drive into the actuating drive can therefore easily be executed. The electronic controller is preferably supplied from the electronic controller of the other actuating drive. The supply according to the invention via the data bus interface provides here the advantage that the further actuating drive does not have to be opened in order to make available a supply with electrical energy. Instead, a data bus interface which is embodied on the outside of a housing can be used as a supply connection. The further actuating drive is therefore a communication participant of the actuating drive. Direct copying of parameters can therefore be carried out easily.

In one refinement of the invention it is possible to provide that the electronic controller is supplied via a data bus interface of a portable computer. It is advantageous that the further communication participant also does not require an external power supply here. The maintenance step can therefore be carried out with the process plant switched off completely, for example during commissioning, in the event of an accident or in the event of failure of the power supply. The portable computer is therefore a communication participant of the actuating drive.

In one embodiment of the invention it is possible to provide that the electronic controller is removed from the actuating drive before the at least one servicing step. It is advantageous here that the servicing step can be carried out at a suitable location without long connecting lines being necessary. This is favorable, in particular, when the further communication participant which has already been mentioned is, for example, a further actuating drive which is arranged remotely in a positionally fixed fashion.

In one embodiment of the invention it is possible to provide that the power supply connection is monitored for switching off and/or failure of a power supply voltage, and in the event of switching off and/or failure the supply of the electronic controller is activated via the data bus interface. It is advantageous here that automatic switching from supplying of the electronic controller via the power supply connection to supplying of the electronic controller via the data bus interface can be executed. It is therefore possible to ensure that supply via the data bus interface takes place only when supply via the power supply connection is not possible.

The invention will now be described in more detail with reference to exemplary embodiments, but is not restricted to these exemplary embodiments. Further exemplary embodiments emerge through combinations of the features of individual claims or a plurality of claims with one another and/or with individual features or a plurality of features of the exemplary embodiments.

BRIEF DESCRIPTION OF THE DRAWINGS

In the drawings, in a highly schematic illustration.

DETAILED DESCRIPTION OF THE PREFERRED EMBODIMENTS

Figure 1:
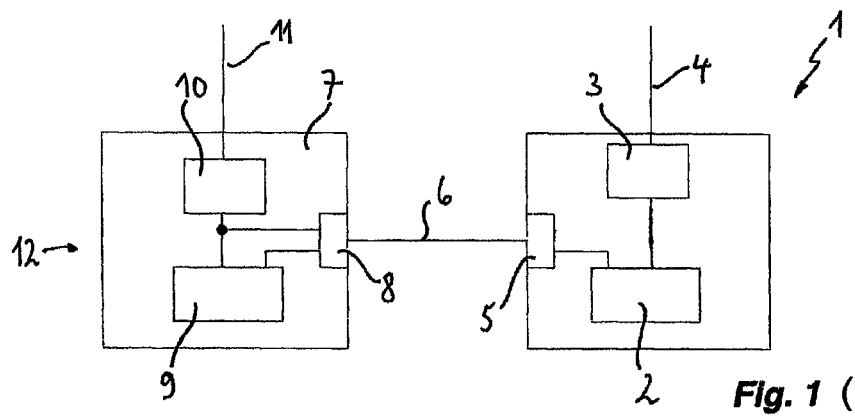
FIG. 1 shows servicing or commissioning of an actuating drive according to the prior art.

FIG. 1 shows a servicing or commissioning of an actuating drive which is denoted in its entirety by 1. The actuating drive 1 has an electronic controller 2 which is embodied and configured in a manner known per se to actuate an activator (not illustrated further), to which a valve is connected.

In order to supply the electronic controller 2 and the activator, the actuating drive 1 has a power supply unit 3, which is fed from a power supply connection 4.

The electronic controller 2 can be parameterized by parameters in order to adjust the actuating drive 1, during commissioning or servicing, to the respectively present activator, for example, an electric motor, and/or to the respectively connected valve or the respectively connected actuating device.

For this purpose, a data bus interface 5, by means of which the parameters can be read out and/or set, is constructed on the actuating drive 1.

For the purpose of commissioning and/or servicing, the data bus interface 5 is connected via a connecting cable 6 to a portable computer 7 which has a corresponding data bus interface 8.

In the described case, the data bus interface 5 is embodied as a USB interface.

The portable computer 7 has communication electronics 9 which are supplied by means of a power supply unit 10 from a power supply connection 11.

The communication electronics 9 organizes the exchange of data via the connecting cable 6 in order to parameterize the electronic controller 2.

Figure 2:
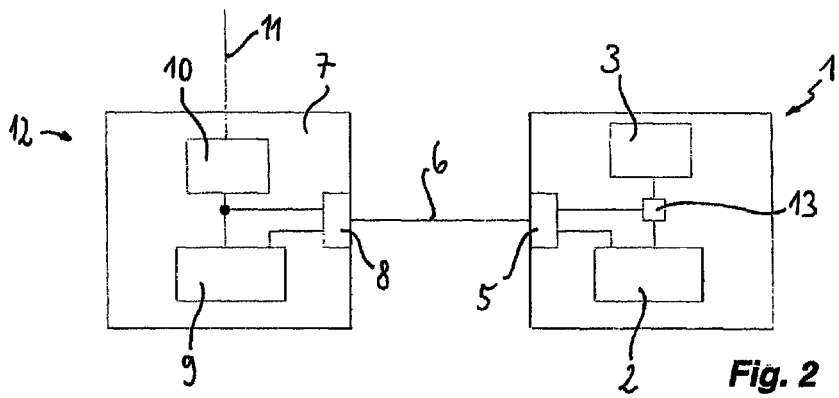
FIG. 2 shows inventive servicing or commissioning of an actuating drive with a computer.

FIG. 2 shows inventive servicing or commissioning or servicing of an actuating drive 1.

The actuating drive 1 has, as described above, an electronic controller 2, a power supply unit 3 and a data bus interface 5, shown here for example as a USB interface. In further exemplary embodiments, the data bus interface 5 is embodied as an Ethernet interface.

In contrast to the actuating drive 1 according to FIG. 1, the electronic controller 2 of the actuating drive 1 according to FIG. 2 can be supplied not only by the power supply unit 3 but also by means of the data bus interface 5. Therefore, FIG. 2 also shows that the power supply unit 3 is disconnected from the power supply connection.

The actuating drive 1 is connected via a connecting cable 6 to a communication participant 12. The communication participant 12 is shown here, for example, as a portable computer 7.

The connecting cable 6 forms here an electrical connection between the data bus interface 5 of the actuating drive 1 and a corresponding data bus interface 8. The actuating drive 1 and the communication participant 12 exchange via this electrical connection. The data bus interfaces 5, 8, which are embodied, for example, as USB interfaces, are able also to make available and transmit electrical energy in addition to the data. In the case of an embodiment as a USB interface, this is achieved, for example, by voltage pins.

The actuating drive 1 is equipped with a switching device 13 with which it is possible to switch between supplying of the electronic controller 2 from a power supply connection 4 connected to the power supply unit 3 (cf. FIG. 1) and supplying the electronic controller 2 via the data bus interface 5. For this purpose, the switching device 13 monitors whether a power supply voltage is present at the power supply unit 3, and switches 2 supply via the data bus interface 5 if this is not the case.

In the case of servicing or commissioning, the actuating drive 1 can therefore be disconnected from the power supply connection 4, since the electronic controller 2 can be supplied via the data bus interface 2.

The servicing steps, for example reading out or describing parameters and/or state variables and/or storing software options and/or firmware updates can therefore be executed in the electronic controller 2 via the data bus interface 5 when the power supply connection 4 is voltageless.

The communication participant 12 is supplied here by means of its power supply unit 10 from a power supply connection 11. Alternatively, the communication participant 12 has, in a manner known per se, an energy store 17, for example an accumulator, from which the electronic controller 2 of the actuating drive 1 can be supplied via the connecting cable 6. A power supply connection can be completely dispensed with in this case.

Figure 3:
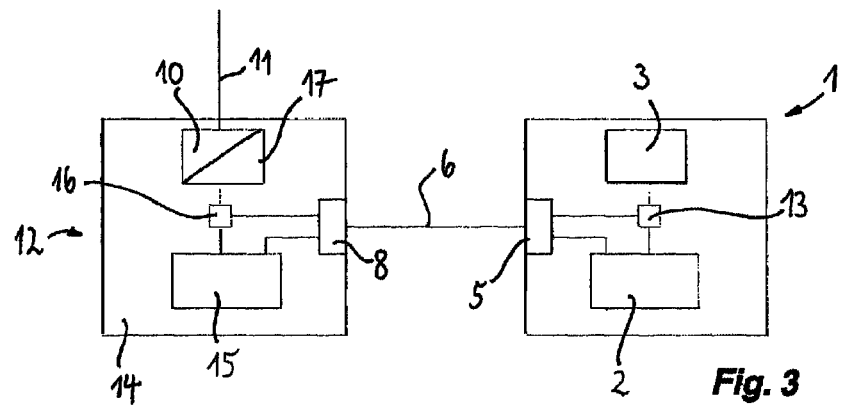
FIG. 3 shows inventive servicing or commissioning of an actuating drive with a further actuating drive.

FIG. 3 shows a further exemplary embodiment according to the invention. Components and functional units which are functionally and/or structurally of the same type or identical to those in the exemplary embodiment according to FIG. 2 are denoted by the same reference symbols and are not described once more separately. Statements relating to FIG. 2 therefore apply with respect to FIG. 3.

The exemplary embodiment according to FIG. 3 differs from the exemplary embodiment according to FIG. 2 in that the communication participant 12 is a further actuating drive 14. The further actuating drive 14 has an electronic controller 15 and a switching device 16 which are embodied, like the electronic controller 2 and the switching device 13, to form the actuating drive 1.

The actuating drive 1 is, as already described with respect to FIG. 2, voltage-free at its power supply unit 3. The electronic controller 2 is therefore supplied via the data bus interface 5 with the electrical energy which is necessary for its operation.

This energy is made available at the data bus interface 8 of the further actuating drive 14, said data bus interface 8 being actuated by the electronic controller 15.

The actuating drives 1, 14 can therefore each be operated not only as a USB device—like the actuating drive 1 here—but additionally as a USB host—like the actuating drive 14 here—in order to make available the supply energy.

The further actuating drive 14 is supplied here by means of its power supply unit 10 from a power supply connection 11.

In order to avoid long connecting cable 6, the electronic controller 2 can be removed from the actuating drive 1 and brought to the further actuating drive 14. For this purpose, the electronic controller 2 can be arranged in a control head (not illustrated further).

After the servicing step or the commissioning, the parameterized, read-out and/or updated electronic controller 2 can be used again in the actuating drive 1. The normal operating mode of the actuating drive 1 can now occur.

In the case of an actuating drive 1 it is proposed to configure an electronic controller 2 and a data bus interface 5 in such a way that the electronic controller 2 can, as an alternative to supplying via a power supply connection 4, be supplied via a data bus interface 5, if the power supply connection 4 is voltage-free.

LIST OF REFERENCE NUMBERS 1 actuating drive
2 electronic controller
3 power supply unit
4 power supply connection
5 data bus interface
6 connecting cable
7 portable computer
8 corresponding data bus interface
9 communication electronics
10 power supply unit
11 power supply connection
12 communication participant
13 switching device
14 further actuating drive
15 electronic controller
16 switching device
17 energy store

The invention claimed is:
1. An electric actuating drive (1), by means of which valves in processing plants are operable in at least one of an automatized or remotely controlled manner comprising an electronic controller (2) configured to process or change at least one of: parameters, state variables; or parameters and state variables of the actuating drive (1), wherein parameters are at least one of: end positions of the valve, adjustment travel, adjustment speeds, torques at the end positions, variables of a switched state or a switching behavior of the connected valve, the electronic controller (2) is supplied with electrical energy during operation via a power supply connection (4) of the actuating drive (1), a data bus interface (5) is connected to the electronic controller (2), and the electronic controller (2) is additionally supplied with electrical energy via the data bus interface (5) and wherein at least one of: the electronic controller (2) is supplied via a data bus interface (8) of a further actuating drive (14) having its own electronic controller (15): or a data bus interface (8) is supplied with electrical energy by a portable computer (7); or the electronic controller (2) is removed from the actuating drive (1) before at least one servicing step and wherein the servicing step comprises at least one of reading out or describing a parameter value or a state variable of the actuating drive (1), and at least one of installing software or carrying out an activation process of an activator of the actuating drive (1), in each case via the data bus interface (5).

2. The actuating drive (1) as claimed in claim 1, wherein the at least one of the parameters or state variables of the actuating drive are transmitted via the data bus interface (5); or the electronic controller (2) is configured to actuate an activator of the actuating drive (1).

3. The actuating drive (1) as claimed in claim 1, wherein the data bus interface (5) is embodied as a USB interface or as an Ethernet interface; or the electronic controller (2) is arranged in a removable fashion on the actuating drive (1).

4. The actuating drive (1) as claimed in claim 1, further comprising a switching device (13) configured to perform switching of the system connection, from supplying the electronic controller (2) via the power supply connection (4) to supplying the electronic controller (2) via the data bus interface (5).

5. The actuating drive (1) as claimed in claim 4, wherein the switching device (13) is configured to perform switching of the system connection in the event of a failure or switching off from supplying the electronic controller (2) via the power supply connection (4) to supplying the electronic controller (2) via the data bus interface (5).

6. A method for at least one of servicing or commissioning an actuating drive (1), by means of which valves in processing plants are operable in at least one of an automatized or remotely controlled manner, comprising supplying an electronic controller (2) of the actuating drive (1), with electrical energy, in a normal operating mode via a power supply connection (4) of the actuating drive (1), at least one of processing or changing parameters, state variables or parameters and state variables of the actuating drive (1), wherein parameters are at least one of: end positions of the valve, adjustment travel, adjustment speeds, torques at the end positions, variables of a switched state or a switching behavior of the connected valve, in the electronic controller (2), triggering at least one servicing step by a data bus interface (5), and supplying the electronic controller (2) with electrical energy via the data bus interface (5) at least during execution of the at least one servicing step, and wherein at least one of: the electronic controller (2) is supplied via a data bus interface (8) of a further actuating drive (14) having its own electronic controller (15) or a data bus interface (8) is supplied with electrical energy by a portable computer (7) or the electronic controller (2) is removed from the actuating drive (1) before at least one servicing step and wherein the servicing step comprises at least one of reading out or describing a parameter value or a state variable of the actuating drive (1), and at least one of installing software or carrying out an activation process of an activator of the actuating drive (1), in each case via the data bus interface (5).

7. The method as claimed in claim 6, further comprising disconnecting the electronic controller (2) from the power supply connection (4) during the servicing step.

8. The method as claimed in claim 6, further comprising supplying the electronic controller (2) from a communication participant (12) which is connected to the data bus interface (5), wherein the communication participant (12) is fed from an accumulator (17).

9. The method as claimed in claim 6, further comprising monitoring the power supply connection (4) for at least one of switching off or failure of a power supply voltage, and in the event of switching off or the failure, activating the supply of the electronic controller (2) via the data bus interface (5).

* * * * *